US005412616A

United States Patent [19]
Gonzalez

[11] Patent Number: 5,412,616
[45] Date of Patent: May 2, 1995

[54] SAFETY MONITORING AND CONTROL SYSTEM

[76] Inventor: Earnest R. Gonzalez, 33761 The Street of the Blue Lantern, Dana Point, Calif. 92629

[21] Appl. No.: 116,372

[22] Filed: Sep. 3, 1993

[51] Int. Cl.$^6$ ............................................. H04B 17/00
[52] U.S. Cl. ........................................................ 367/13
[58] Field of Search .................... 137/38, 39; 367/135, 367/136, 13

[56] References Cited
U.S. PATENT DOCUMENTS
5,048,552 9/1991 Bourne .................................. 137/39

Primary Examiner—Daniel T. Pihulic
Attorney, Agent, or Firm—Kenneth W. Float

[57] ABSTRACT

A programmable, closed-loop control system that provides for control under normal and seismic conditions. The present system integrates monitoring and control functions and provides for reconfigurable control of these functions. The seismic monitoring and control system optimally controls valve-type fluid flow systems. Separate control algorithms may be programmed by a user to control the system under both normal and seismic conditions. In its broadest aspects, the present system comprises a sensor for sensing a predetermined condition and for providing output signals indicative thereof, a switch, and a programmable controller coupled to the sensor and switch. The controller includes a seismic sensor for detecting a seismic disturbance and providing output signals indicative of the seismic disturbance. The controller responds to the output signals from the sensor and seismic sensor, and provides first control signals that are applied to the switch in the absence of a seismic disturbance and second control signals that are applied to the switch in the presence of a seismic disturbance to control the operation of the system. The safety monitoring and control system may further comprise a host computer coupled to the controller for programming it in response to operator inputs. In certain embodiments, the present system may comprise a fluid control valve for controlling the flow of a fluid therethrough, and a programmable valve actuator coupled to the fluid control valve and to the controller, for actuating the valve in accordance with programmable control logic contained therein, and for actuating the valve in response to external control signals applied to the control logic by the controller. An alarm system may also be coupled to the programmable controller that is activated thereby in the event of an emergency condition detected by the controller.

14 Claims, 6 Drawing Sheets

SAFETY MONITORING AND CONTROL SYSTEM

BACKGROUND

The present invention relates generally to safety monitoring and control systems, and more particularly, to safety monitoring and control systems that provide for programmable, closed-loop control under normal and seismic conditions.

In the past, safety monitoring and control systems for use in commercial and industrial applications have been developed piecemeal by using separate subsystems that provide for separate control or safety monitoring functions. Such conventional systems are therefore not integrated, and an operator must understand the aspects of each subsystem in order to fully control the overall system. Typically, none of the respective subsystems provide information to other subsystems, and hence valuable data and information may not readily be available to the operator or to other subsystems to optimally control the overall system. In addition, the operator must perform additional monitoring and control functions when data or information is required by different subsystems.

For example, in a water distribution system having a plurality of reservoirs and a supply line distribution system, in the event of a seismic disturbance that is sufficient to break water supply lines, conventional systems may automatically shut down water service because of a breech in a water supply line. However, there may be a simultaneous requirement for water service, such as by fire department personnel, for example, in order to fight rites that are also a result of the seismic disturbance. Consequently, when using conventional non-integrated control systems, there may be a conflict that is not easily reconcilable and that results in potential problems.

Accordingly, it is an objective of the present invention to provide for integrated safety monitoring and control systems that permit programmable, closed-loop control under normal and seismic conditions.

SUMMARY OF THE INVENTION

In order to provide for the above and other objectives, the present invention comprises a programmable, closed-loop safety monitoring and control system that provides for system control under normal and seismic conditions. The present invention provides for a system that integrates monitoring and control functions and provides for reconfigurable control of these functions. More particularly, the present invention is a seismic monitoring and control system that controls valve-type systems under normal and seismic conditions. Separate control algorithms may be programmed by a user to control the system under both normal and seismic conditions.

More specifically, and in its broadest aspects, the present invention is a safety monitoring and control system that comprises a sensor for sensing a predetermined condition and for providing output signals indicative of the predetermined condition, and a switch. A programmable controller is coupled to the sensor and to the switch and comprises a seismic sensor for detecting a seismic disturbance and providing output signals indicative of the seismic disturbance. The programmable controller is adapted to respond to the output signals from the sensor and the output signals from the seismic sensor, and provide first control signals that are applied to the switch in the absence of a seismic disturbance and second control signals that are applied to the switch in the presence of a seismic disturbance so as to control the operation of the system. The safety monitoring and control system may further comprise a host computer coupled to the programmable controller that is adapted to program the programmable controller in response to operator inputs.

In certain embodiments, the safety monitoring and control system may further comprise a fluid control valve for controlling the flow of a fluid therethrough, and a programmable valve actuator coupled to the fluid control valve and to the programmable controller, for actuating the valve in accordance with programmable control logic contained therein, and for actuating the valve in response to external control signals applied to the control logic by the programmable controller. An alarm system may also be coupled to the programmable controller that is activated thereby in the event of an emergency condition detected by the programmable controller.

In one specific embodiment, the present invention comprises a fluid flow safety monitoring and control system for controlling distribution of a fluid. The system comprises a reservoir for containing a fluid, and a level sensor coupled to the reservoir for indicating fluid level. A fluid flow sensor is provided for sensing a fluid flow at an output of the system and for providing an output signal indicative thereof. A valve is coupled between the reservoir and the fluid flow sensor. A programmable valve actuator is coupled to the valve for actuating the valve in accordance with programmable control logic contained therein, and for actuating the valve in response to external control signals applied to the control logic. A programmable controller coupled to the level sensor, fluid flow sensor, and programmable valve actuator, and which comprises a seismic sensor for detecting a seismic disturbance and providing output signals indicative of the seismic disturbance. The programmable controller is adapted to respond to output signals generated by the level sensor, fluid flow sensor, programmable valve actuator, and seismic sensor, and generate first control signals that are applied to the programmable valve actuator in the absence of a seismic disturbance and second control signals that are applied to the programmable valve actuator in the presence of a seismic disturbance so as to control the distribution of fluid from the fluid flow system. The host computer may also be provided as part of the system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
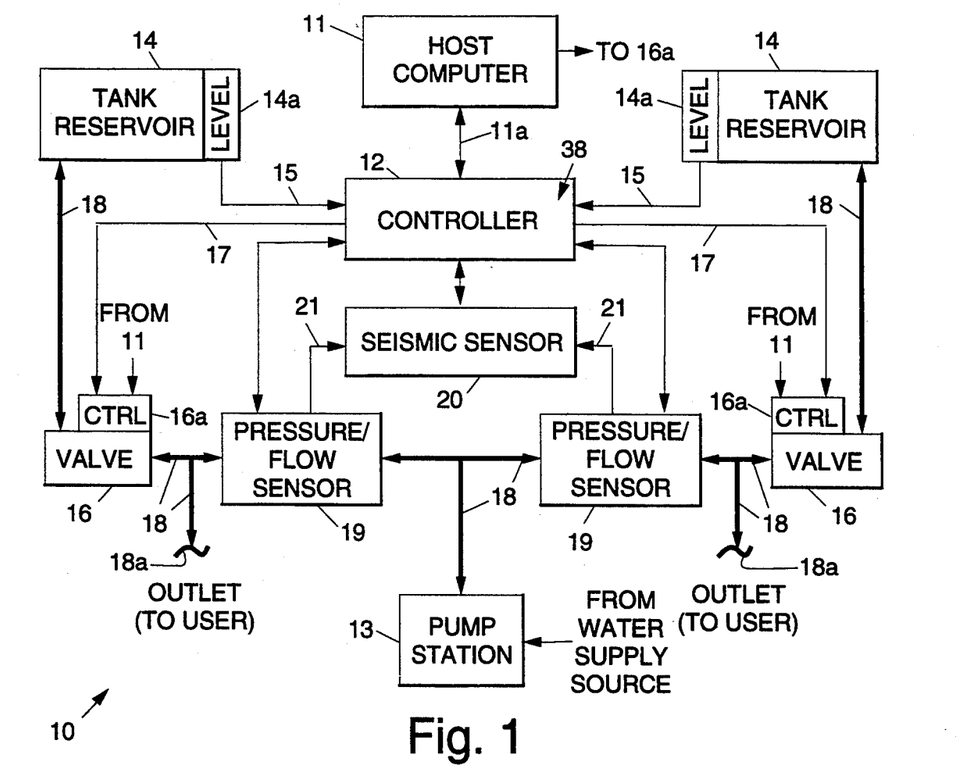
FIG. 1 shows a first embodiment of a safety monitoring and control system in accordance with the present invention that illustrates a water distribution application of the present invention.

Referring to the drawing figures, FIG. 1 shows a first embodiment of a safety monitoring and control system 10 in accordance with the present invention that illustrates a water distribution application. The safety monitoring and control system 10 is comprised of several primary components, including a host computer 11, a controller 12, a seismic sensor 20, and an actuator 16a. The host computer 11 may be a conventional personal computer, for example. The controller 12 is known as a FloSafe TM safety and management system manufactured by the assignee of the present invention. It is to be understood that the host computer 11 may be adapted to control a plurality of controllers 12, but only one controller 12 is shown in FIG. 1 for the purposes of illustration. The host computer 11 is typically located at a central station or headquarters and communicates with the controller 12 over a communications link 11a. The communications link 11a may be a radio communications link, a fiber optic communications link, or a hard wired communications link, as the case may be.

As will be described in detail hereinbelow, the controller 12 comprises a computer system that controls the system 10 independent of the host computer 11. The controller operates in two distinct modes, including normal operating mode and emergency operating mode. These modes are programmable by a user and may be adapted for different applications other than the water distribution application shown in FIG. 1. The seismic sensor 20 is a programmable logic controller that is programmed to operate in two distinct modes, including normal operating mode and emergency operating mode. The emergency operating mode is engaged in case of a seismic event. The actuator 16a is also a programmable logic controller that is programmed to operate in three distinct modes, including independent operation in case of an emergency, in a controlled mode under control of the controller 12, and in a controlled mode under control of the host computer 11. The actuator 16a also monitors a selected sensor 19, and in its independent operating mode acts to operate a valve 16 coupled thereto based upon signals provided by the sensor 19 and its internally programmed logic. In the event that the link between the actuator 16a and the sensor 19 is interrupted, the actuator 16a is typically programmed to close the valve 16.

In the disclosed water distribution and control application shown in FIG. 1, the system 10 includes a plurality of tank reservoirs 14 that each include a respective water level sensor 14a that provide water level signals 15 that are indicative of the respective levels of water in the reservoirs 14. The respective level signals 15 are coupled to the controller 12 for use thereby. The seismic sensor 20 provides for detection of seismic disturbances and provides output signals that are indicative thereof that are used by the controller 12, and which are reported to the host computer 11 by the controller 12.

One seismic sensor 20 may be used to provide dam and information that controls many reservoirs 14, such as at a tank farm, for example. The seismic sensor 20 is also directly coupled to the actuator 16a or valve controller 16a (CTRL). The seismic sensor 20 may be a FloLoc TM seismic control system manufactured by the assignee of the present invention and which is generally described in U.S. Pat. Nos. 4,971,094 or 5,058,172, for example, and which are incorporated herein by reference.

The seismic sensor 20 is a logic controller that is adapted to control a single valve 16 or up to eight valves 16 or stations, or execute a complete facility shutdown in the case of a seismic emergency. The seismic sensor 20 employs a free-motion moving mass to detect seismic events in the range of 0.05 g to 0.50 g. The signal generated from the seismic sensor 20 may be used to close the valve 16, shut down motors, or trip an alarm system 27, and the like. The seismic sensor 20 is adapted to directly control electrical motors and relays, or trigger a solenoid to control hydraulic and pneumatic equipment. The seismic sensor 20 is also adapted to receive externally generated signals such as fire alarm signals, thus providing a trigger during any emergency. Because the material (fluid, for example) that is controlled by the system 10 does not flow through the triggering mechanism (the seismic sensor 20), the seismic sensor 20 is safely isolated from the hazardous materials it controls. The seismic sensor 20 does not react to normal industrial or vehicular vibrations. The seismic sensor 20 has adjustable sensitivity for seismic events in the range of 0.05 g to 0.50 g; it includes status indicator displays for seismic events (armed or tripped); it incorporates on-site and remote control capabilities for all functions, including display lights and switches; it may simultaneously control up to eight stations; and includes battery, solar and AC power supply capability provided by a self-contained DC uninterruptable power supply, an AC rechargeable power supply, or a solar powered power supply.

Each respective tank reservoir 14 is coupled by way of respective water supply lines 18 and valves 16 to outlets 18a that are coupled to users of the water system, such as homes and businesses. In the disclosed water distribution application, each of the valves 16 may be on the order of four feet in diameter and must be controlled in a manner that prevents a condition known as "hammering" which is caused by rapidly closing the valve 16. Each of the valves 16 may be an automatic control valve 16 (ACV), as they are known in the art. Each of the automatic control valves 16 is comprised of a valve controller 16a (CTRL) or actuator 16a that is an intelligent computer-controlled switch that is adapted to control the valve 16 in accordance with either applied control signals 17 provided by the controller 12 or by means of internally generated control signals that are factory programmed, for example. The valve controller 16a (CTRL) or actuator 16a may be a FloPak TM DC valve actuator manufactured by the assignee of the present invention, for example, which is adapted to communicate with the controller 12 and seismic sensor 20 of the system 10. The valve controller 16a (CTRL) or actuator 16a is adapted to open and close the valve 16 if certain conditions are within preprogrammed ranges. In addition, the valve controller 16a (CTRL) or actuator 16a is adapted to close the valve 16 at a speed that prevents hammering of the valve 16. Each of the valves 16 is coupled to the controller 12 which is adapted to provide control signals 17 thereto that open and close the respective valves 16. The internally generated control signals are used when the communications link between the controller 12 and a valve 16 is interrupted, and the control signals 17 generated by the controller 12 are not received by the valve 16.

The valve controller 16a or actuator 16a is a 24 volt DC valve actuator suitable for operating any rotational valve 16 regardless of size. The actuator 16a is driven by two powerful ceramic magnet motors. Built-in batteries switch on any time AC current is interrupted, enabling the actuator 16a to operate a typical 24 inch butterfly valve 31 through a minimum of six open/close cycles. Where no AC power is available, the actuator 16a operates on batteries charged by solar cells. The actuator 16a is a dual motor system that offers the security of redundancy ands increased unseating torque. The actuator 16a includes a manual hand wheel that provides for valve closure. The actuator 16a includes priority shutdown modes wherein a seismic event overrides all others, manual mode overrides remote control mode, and the remote control mode functions only when the seismic and manual modes are not engaged.

A plurality of pressure and/or flow sensors 19 are disposed in the water supply lines 18 between each of the valves 16 and a pump station 13. Each of the pressure and/or flow sensors 19 produce pressure and/or flow signals 21 that are coupled to the controller 12, and which are indicative of the relative pressure or flow rate at an outlet 18a of the system 10. The pump station 13 is typically supplied with water from a water supply source, such as a local department of water and power (DWP), for example, which is common to many communities.

Figure 1A:
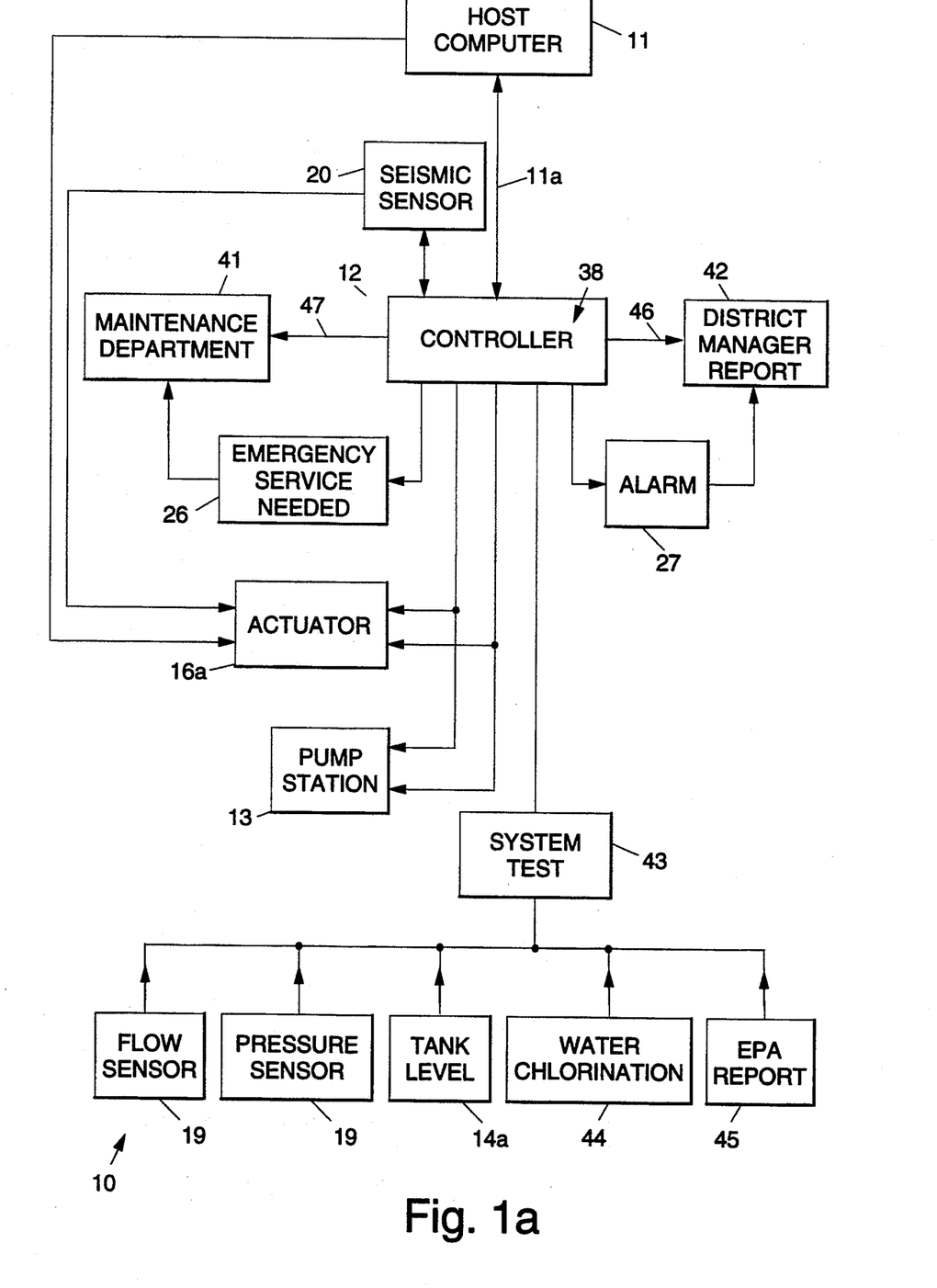
FIG. 1a illustrates control flow algorithms that may be used in the controller shown in FIG. 1.

The controller 12 is programmable and is adapted to implement predetermined control algorithms 38 that are programmed by the user and which are designed for the particular application to which the system 10 is used. In the water distribution application of FIG. 1, the controller 12 may implement the control flow algorithms 38 shown in FIG. 1a, for example. The flow diagram of FIG. 1a is presented to illustrate one possible control scheme for the water distribution application, but it is to be understood that this is only for the purposes of example. Clearly, other control algorithms 38 may be readily implemented depending upon the requirements of the system 10. In addition, the controller 12 is adapted to report to the host computer 11 regarding predetermined maintenance conditions, such as operability of each of the valves 16, water level in the reservoirs 14, and flow rates or pressures in the supply lines 18 derived from the pressure or flow sensors 19, and the like.

The seismic sensor 20 may be programmed with data indicative of allowable ranges for a plurality of different conditions that are a function of the system 10. If a seismic disturbance is such that all conditions are within their respective ranges, then normal operation is allowed to continue. However, if one or more conditions produce data that is outside one or more of the ranges, then signals are provided to the algorithms 38 of the controller 12 and the system 10 is caused to operate accordingly. For example, in the water distribution application of FIG. 1, if a one of the pressure or flow sensors 19 indicates a large drop in pressure, such as may be caused by a break in the supply line 18, the algorithms 38 may be programmed to shut down the system 10. However, if there is a simultaneous requirement for water service, such as is required by fire department personnel, then the algorithm would not shut down the system 10 until the need subsided. Each requirement of the system is considered in implementing the algorithms 38 which are described below with reference to FIG. 1b.

Operation of the system 10 will be generally described with reference to FIG. 1a. The controller 12 is a stand-alone safety monitoring controller, and operates independent of the host computer 11. The seismic sensor 20 functions to signal the controller 12 to enter into a safety mode whose task is to prevent the loss of water. The controller 12 calls up the maintenance department when any of the components need preventive maintenance. The district manager can download partial or full report regarding the status of the system 10. If a maintenance report has not been performed as scheduled, the controller sends a second request and at the same time sends a copy of the report to the district manager. In an alarm condition, the controller 12 alerts the district manager, alerts the service department and the system manufacturer. The controller 12 continuously tests and compares each component to which it communicates and stores the test information until the next report is downloaded to the district manager. The flow sensor senses the quantity of water passing through the valve 16. The pressure sensor senses pressure in the supply line 18 and provides signals to the controller 12 to prevent hammering of the supply line 18. The controller 12 regulates the speed at which the actuator 16a closes the valve 16.

The tank level sensor 14a functions to keep the tank reservoir 14 at its highest level. The water chlorination system tests the pH of the water in the tank reservoirs 14 and adds chlorine as required. An EPA water quality report is generated by the EPA reporting system based upon the water tests performed before and after chlorination. The actuator 16a controls the valve 16 so that it is modulated between open and closed as usage demands. The controller turns on pumps at the pump station 13 when the water level in a reservoir 14 drops below a predetermined threshold and turns the pump on when the reservoir 14 is full. The host computer 11 communicates with the controller. A normal operation signal is communicated between the controller 12 and the actuator 16a and pump station 13. A fail safe signal is communicated to the actuator 16a and the pump station 13 in case of seismic activity and if any of the components fail, and if the controller 12 does not have sufficient information to make a decision. The fail safe signals closes the valve 16 and turns off the pump station 13 and sends an emergency alarm to relevant personnel.

Figure 1B:
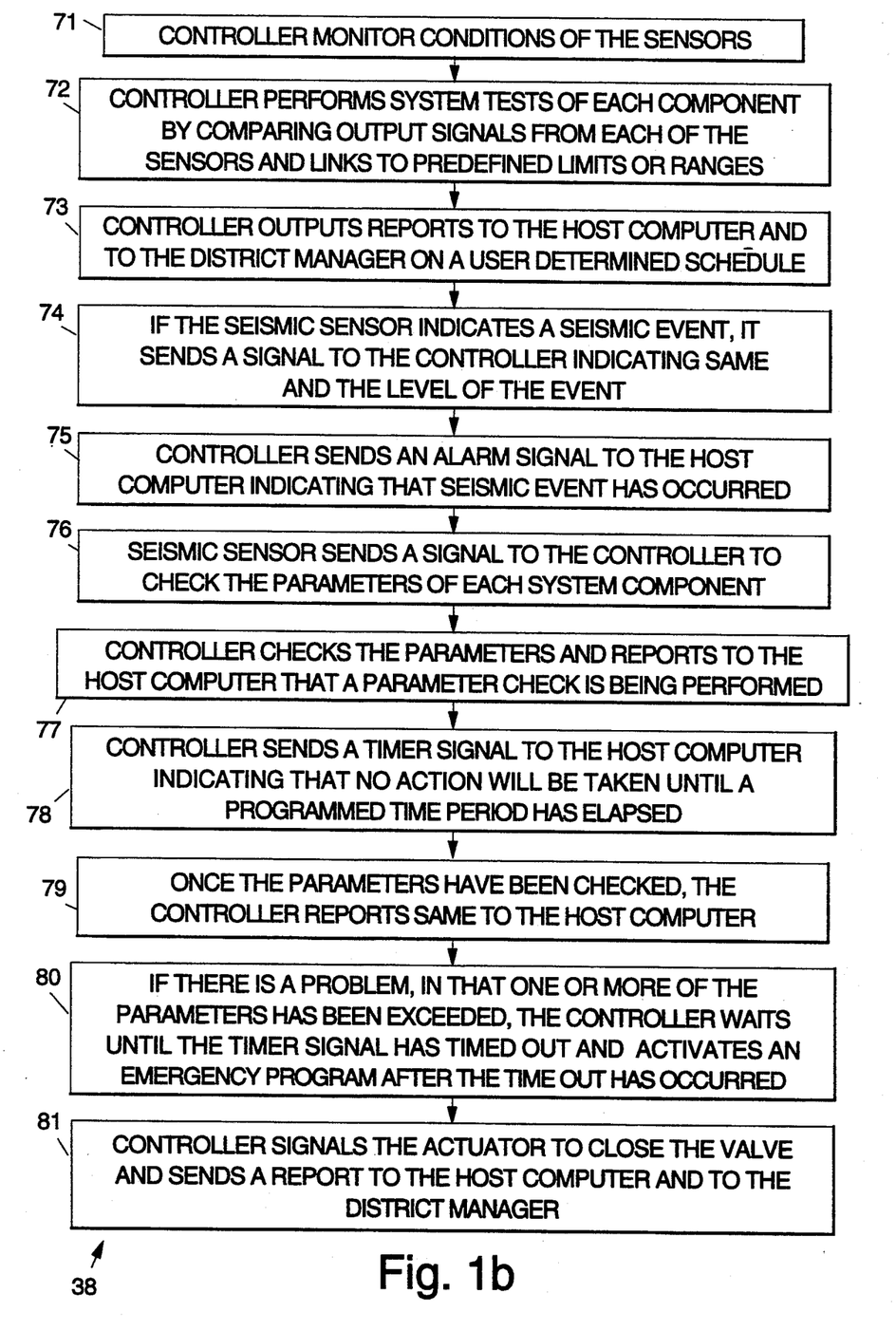

Referring to FIG. 1b, the exemplary control algorithms 38 implemented in the controller 12 are as follows. The control algorithms 38 include normal and emergency operating flow paths. In the normal flow path, the controller 12 monitors various conditions of the sensors coupled thereto, including flow rate, pressure, chlorination level or pH of the water in the reservoir 14, as is provided in step 71. The controller 12 performs system tests of each of the components coupled thereto based on a user determined schedule, as is provided in step 72. These tests comprise a comparison of the output signals from each of the various sensors and links in the system 10 to predefined limits or ranges for each component or condition. The controller 12 outputs reports to the host computer and to the district manager 42 based on a user determined schedule, as is provided in step 73. In the case of a seismic event wherein the seismic sensor 20 is activated, the seismic sensor 20 sends a signal to the controller indicating that a seismic event has occurred and the level of the event, as is provided in step 74. The controller 12 in turn sends an alarm signal to the host computer 11 indicating that seismic event has occurred, as is provided in step 74. The seismic sensor 20 sends a signal to the controller 12 to check the parameters of each of the components of the system 10, as is provided in step 75. The controller 12 checks the parameters and reports to the host computer 11 that a parameter check is being performed, as is provided in step 76. The controller 12 sends a timer signal to the host computer 11 indicating that no action will be taken until a programmed time period has been reached, as is provided in step 77. Once the parameters have been checked, the controller 12 reports same to the host computer 11, as is provided in step 78. If there is a problem, in that one or more of the parameters has been exceeded, for example, the controller 12 waits until the timer signal has timed out, as is provided in step 79. Then the controller 12 activates an emergency program after the time out has occurred, as is provided in step 80. The controller signals the actuator 16a to close the valve 16 and sends a report to the host computer 11 and to the district manager 42, as is provided in step 81.

If the link 11a between the host computer 11 and the controller 12 is broken, then the controller 12 operates on its own. If the link between the controller 12 and the actuator 16a is broken, then the actuator 16a operates on its own as an independent logic controller. The actuator 16a checks either the pressure or flow rate data from the pressure/flow sensor 19 and closes the valve 16 if the pressure or flow rate is outside of the preset range. If the actuator 16a loses contact with the pressure/flow sensor 19, then it closes the valve 16.

Figure 2:
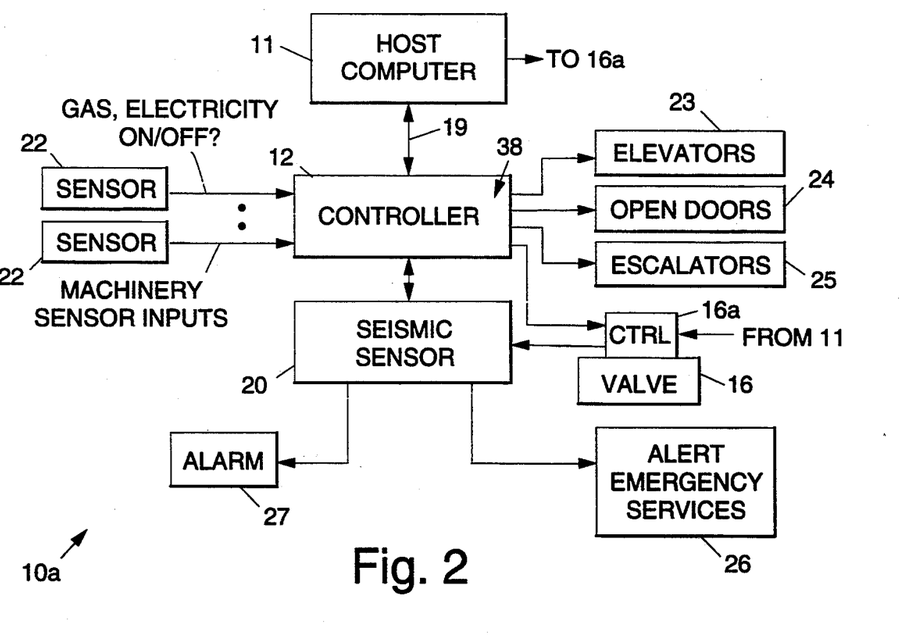
FIG. 2 shows a second embodiment of a safety monitoring and control system in accordance with the present invention that illustrates an industrial application.

Referring to FIG. 2, it shows a second embodiment of a safety monitoring and control system 10a in accordance with the present invention that illustrates an industrial application of the present invention. The safety monitoring and control system 10a is comprised of the host computer 11 and the controller 12 which includes the seismic sensor 20. Sensor inputs to the controller 12 are derived from sensors 22 disposed on gas and electrical valves (not shown) at the industrial site and on machinery (not shown), such as robots, and the like. The controller 12 is coupled to such mechanisms as elevators 23, doors 24, escalators 25, and to controllers 16a of automatic control valves 16, for example. In addition, the controller 12 may be coupled to an alarm system 27 and to communications equipment 26 that is adapted to alert emergency services, such as police and fire personnel, in the case of an emergency. The control algorithms 38 for the safety monitoring and control system 10a of FIG. 2 are different from those of the system 10 of FIG. 1, and are a function of the application. The programming of such algorithms 38 is considered to be routine for those skilled in the art and will not be discussed in further detail.

Figure 3:
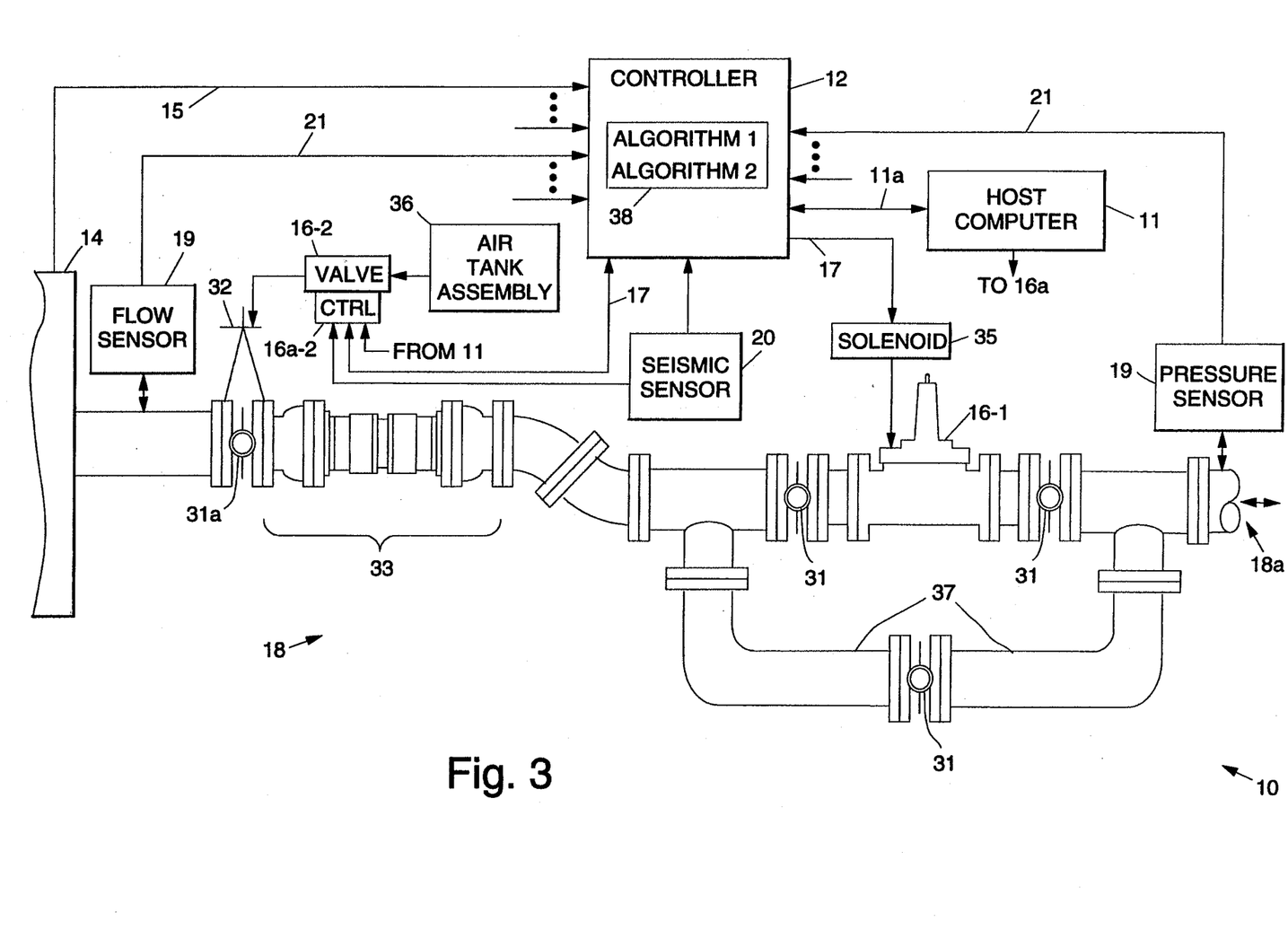
FIG. 3 shows a more detailed illustration of a portion of the safety monitoring and control system of FIG. 1.

Referring to FIG. 3, it shows a more detailed illustration of a portion of the safety monitoring and control system 10 shown in FIG. 1. The safety monitoring and control system 10 is shown having a reservoir 14 coupled to the controller 12 so that water level signals 15 are applied thereto. The host computer 11 is coupled to the controller 12 and is adapted to control a plurality of water distribution systems and provide a means for testing and reprogramming the respective controllers 12 thereof. The reservoir 14 is coupled to a water supply system 18 that includes a plurality of butterfly valves 31, a pneumatic controller 32 coupled to a first butterfly valve 31a, a flexible coupling 33, a first automatic control valve 16-1, and a feedback path 37 coupled around the first automatic control valve 16-1. The first automatic control valve 16-1 may be an altitude valve adapted for control by the seismic sensor 20. The pneumatic controller 32 may be an air-to-open, spring-to-close actuator having a hydraulic override and limit switch, for example. A pressure sensor 19 is coupled to the water supply system 18 adjacent its outlet 18a, and which is coupled to the controller 12 to provide pressure signals 21 thereto. A flow sensor 19 is coupled to the water supply system 18 adjacent the reservoir 14 and is coupled to the controller 12 to provide flow rate signals 21 thereto. The first automatic control valve 16-1 is coupled by way of a solenoid 35 to the controller 12. As is indicated in FIG. 2, a plurality of reservoirs 14, flow sensors 19 and pressure sensors 19 may be coupled to the controller 12. A air tank assembly 36 is coupled through a second automatic control valve 16-2 to the pneumatic controller 32. The controller 12 is coupled to the second automatic control valve 16-2 by means of its controller 16a-2. The seismic sensor 20 provides seismic input data to algorithms 38 implemented by the controller 12. The algorithms 38 are generally described with reference to FIG. 2 above.

Figure 4:
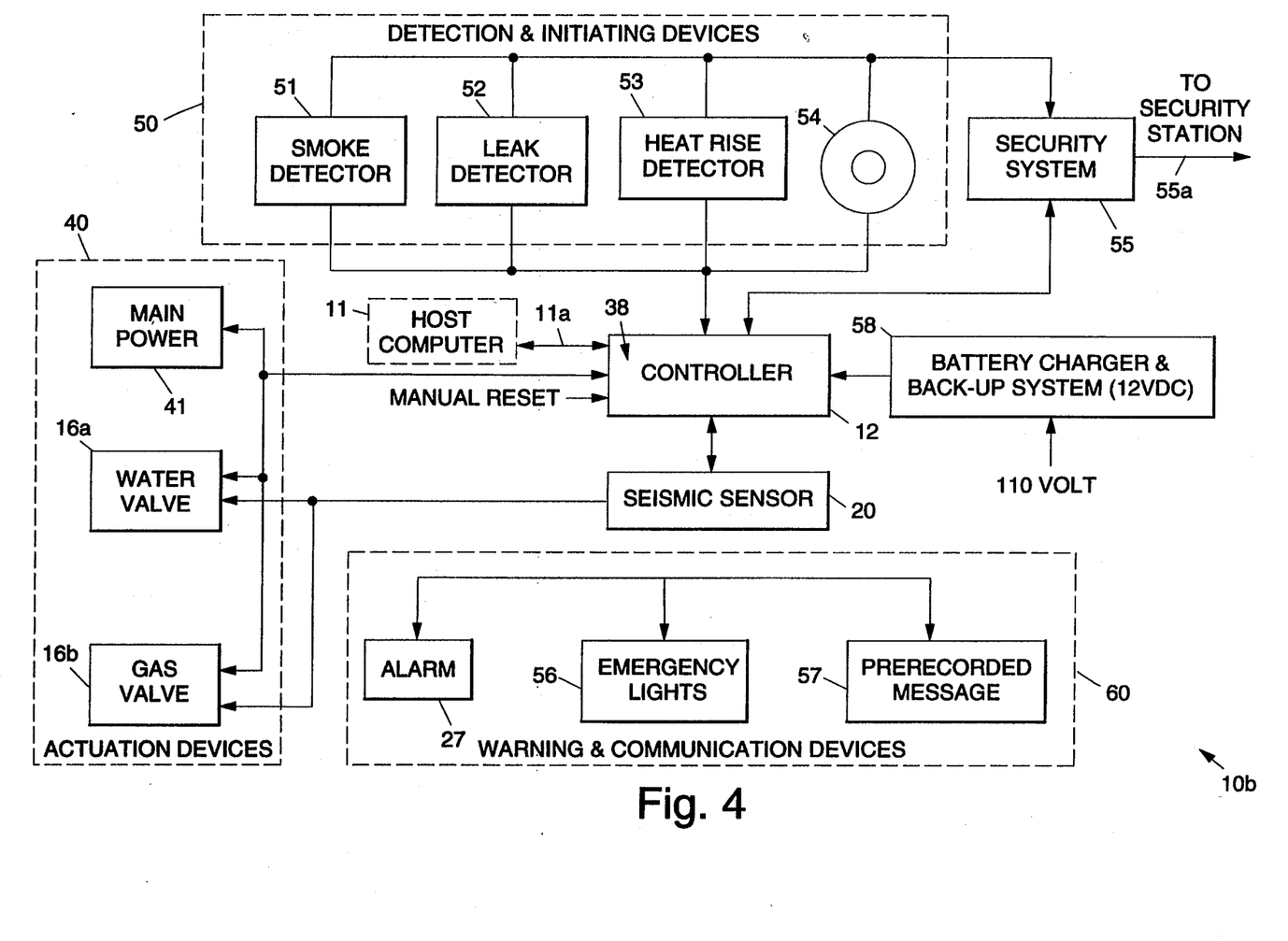
FIG. 4 illustrates a third embodiment of a safety monitoring and control system in accordance with the present invention that illustrates a residential application.

Referring to FIG. 4, it illustrates a third embodiment of a safety monitoring and control system 10b in accordance with the present invention that illustrates a residential application of the present invention. In the residential application, the safety monitoring and control system 10a is comprised of the controller 12 which includes the seismic sensor 20. The controller is coupled to a battery charger and back-up system 58, which is powered by 110 volt AC power. A host computer 11 may be employed, but is not necessarily required. In some cases, a security system 55 may replace the host computer 11. A plurality of actuation devices 40 may be employed including a main power sensor 41 typically coupled to a switch control panel for the residence. Sensors are provided on a water valve 16a and gas valve 16b for the residence. A plurality of detection and initiating devices 50 may also be employed which include a smoke detector 51, leak detector 52, heat rise detector 53, and panic button 54. Each of the detection and initiating devices 50 are coupled to the security system 55 and to the controller 12. The security system 55 is typically coupled to a security station by means of a communication link 55a, generally provided by a modem and a telephone line. A plurality of warning and communication devices 60 may also be coupled to the controller 12 and may include an alarm 27, emergency lights 56, and to a tape recorder 57 that includes a prerecorded message that is broadcast in case of an emergency. The warning and communication devices 60 are activated by the controller 12 in case of an emergency, as is dictated by the algorithms 38 residing therein.

Figure 5:
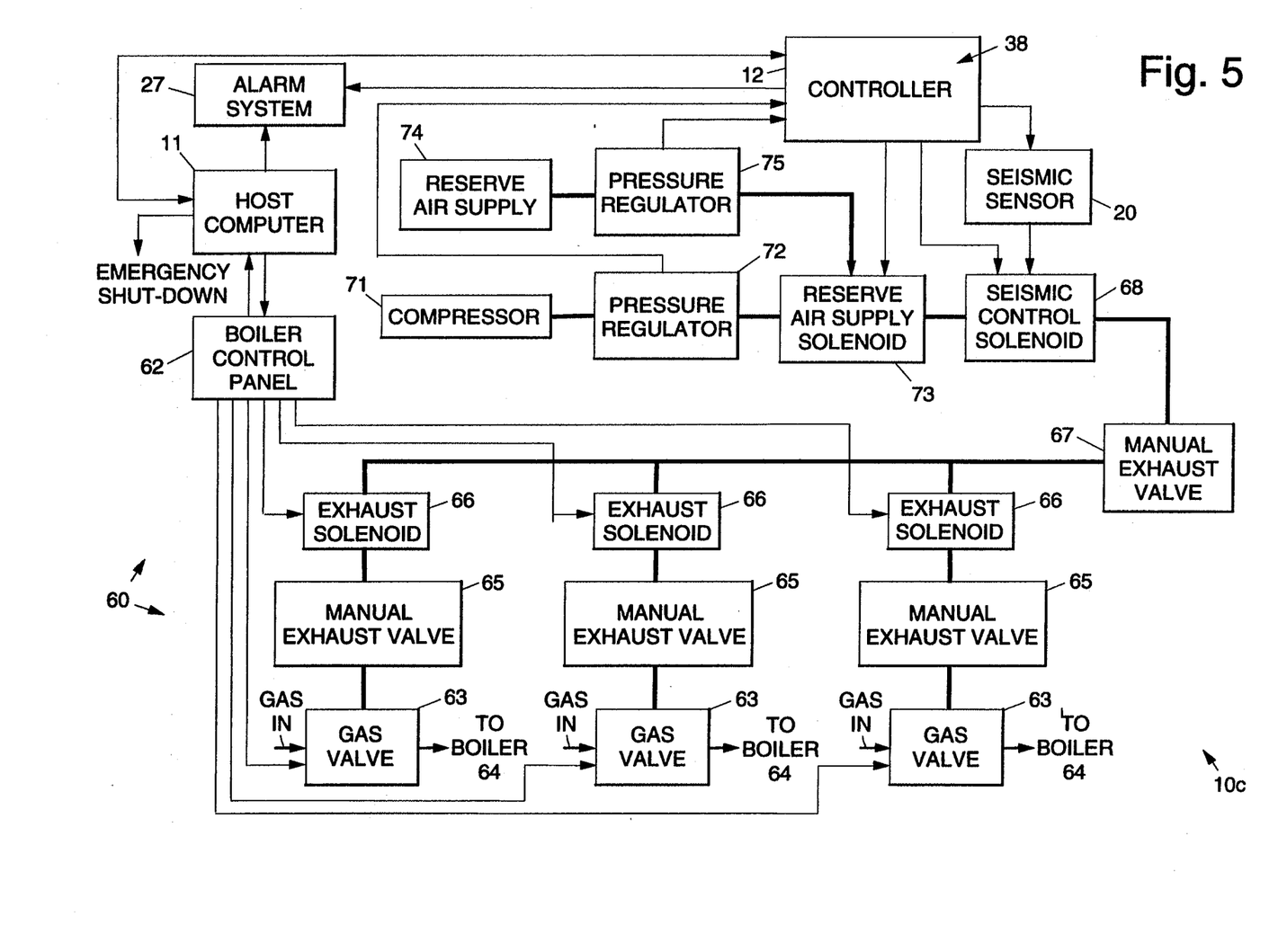
FIG. 5 illustrates a fourth embodiment of a safety monitoring and control system in accordance with the present invention that illustrates a pneumatic control application.

Referring to FIG. 5, it illustrates a fourth embodiment of a safety monitoring and control system 10c in accordance with the present invention that illustrates a pneumatic control application of the present invention. The safety monitoring and control system 10c is used with a boiler control system 60 that includes a boiler control panel 62 and a plurality of gas valves 63 that supply gas to a plurality of boilers 64. A host computer 11 is coupled to the controller 12 and to the boiler control panel 62. An alarm system 27 is provided and is coupled to the host computer 11 and to the controller 12. A compressor 71 and pressure regulator 72 are coupled by way of a reserve air supply solenoid 73 to a seismic control solenoid 68. The seismic control solenoid 68 is coupled to the individual manual exhaust valve 67. A reserve air supply 74 is coupled through a pressure regulator 75 to the reserve air supply solenoid 73 and is activated in the case where the compressor 71 has a failure. The boiler control system 60 also includes a master manual exhaust valve 67, and a plurality of exhaust solenoids 66 and individual manual exhaust valves 65 that are coupled between the individual manual exhaust valve 67 and the respective gas valves 63. The controller 12 is coupled to the seismic control solenoid 68, the reserve air supply solenoid 73, the pressure regulators 72, 75, and to the alarm system 27.

The control algorithms 38 residing in the controller 12 are adapted to monitor the boiler control system in for the occurrence of a seismic disturbance, and to provide data to the host computer to indicate the status of the various components of the boiler control system 60 and whether the system should be shut down in case of an emergency. During normal operation, the host computer 11 and boiler control panel 62 control and manage the boiler control system 60 to control the flow of gas to the plurality of boilers 64. In the event of a problem with any of the components that are monitored by the controller 12, the control algorithms 38 provide output signals that are sent to the host computer 11 indicating the status of the components and whether an emergency condition is present requiring emergency shut-down of the boiler control system 60, typically achieved by closing one or more gas valves 63, and venting the air lines between the compressor 71 or reserve air supply 74 and the respective pneumatically controlled bas valves 63. This is achieved through commands sent from the host computer 11 to the boiler control panel 62 which actuates the exhaust solenoids 66, or by manually venting the boiler control system 60 using either the master manual exhaust valve 67 or the individual manual exhaust valve 65.

In one reduced to practice embodiment of the present controller 12 designed for a water distribution application, it provides for a fluid flow safety and management system that is specifically designed to overcome the objection of some users in the water industry of the requirement to shut down valves immediately after a seismic event, withholding water needed for firefighting and other emergency uses when there was no other indication of a problem with the system. The controller 12 uses logic that combine signals of from one to eight flow and/or pressure sensors 19 with the signal from the seismic sensor 20 to ensure that the closure of any valve 16 after a seismic event is the result of a large detectable fluid loss. This is determined by reading a change in flow rate that occurs within a preprogrammed time limit. In addition to the described water distribution application, the present invention is applicable to the control and management of petroleum and other hazardous fluid materials.

The heart of controller 12 is the seismic sensor 20 that employs the free-motion moving mass to detect seismic events (earthquakes or explosions) in a range of from 0.05 g to 0.50 g. The design of the seismic sensor 20 is tri-axial, in that it reacts equally to ground motion or aerial shock wavefronts arriving from any compass direction and in all planes.

When the controller 12 senses a seismic event, the following occurs. Two electronic timing circuits are switched on. The first timing circuit resets the seismic sensor 20 a few minutes after the initial seismic event is over, enabling the seismic sensor 20 to sense aftershocks. The second timing circuit, comprising an intervention timer, begins a preset countdown period. Any large increase in flow rate within this time period should not logically result from demand resulting from firefighting demand. If no change in flow rate is detected within this time period, all valves 16 remain open. If any sensor 19 detects an increase in flow rate above a preset limit during this time period, the valve 16 controlled by that particular sensor 19 is closed.

Even when there is no seismic event, the controller 12 constantly guards the system 10. If water levels in the reservoirs 14, flow rates, or pressures deviate beyond preset limits, a warning signal is activated. In addition, a warning signal is provided when the following conditions occur: loss of signal from any flow or pressure sensor 19, failure of AC power, or a drop in battery voltage below safe limits. If desired, any of these warning conditions may also be programmed to initiate valve closures. Regardless of conditions, the controller 12 may be operated manually, both at the site of a valve 16 and at a central control station. The controller 12 has RS-232/RS-485 communications capability with an upgrade for use of fiber optics, and all timing and sensor parameters are completely programmable to suit the requirements of each application.

Thus there has been described new and improved safety monitoring and control systems that provides for programmable, closed-loop control of various types of systems under normal and seismic conditions. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A closed loop safety monitoring and control system comprising:

a switching device;

a sensor coupled to the switching device for sensing a predetermined condition thereof and for providing sensor output signals indicative of the predetermined condition;

a programmable controller comprising a seismic sensor for detecting a seismic disturbance and providing seismic output signals indicative of the seismic disturbance, wherein the controller is coupled between the sensor and the switching device and forms a closed loop control system for monitoring and controlling the switching device, and wherein the controller is responsive to the sensor output signals and the seismic output signals, and provides first control signals that are applied to the switching device in the absence of a seismic disturbance to provide for closed loop control of the switching device under normal operating conditions, and provides second control signals that are applied to the switching device in the presence of a seismic disturbance to provide for closed loop control of the switching device under emergency operating conditions.

2. The closed loop safety monitoring and control system of claim 1 wherein the seismic sensor comprises a signal output that is directly coupled to the switching device for actuating the switching device to place it in a predetermined condition in the event of failure of the programmable controller.

3. The safety monitoring and control system of claim 1 which further comprises:
   a fluid control valve for controlling the flow of a fluid therethrough; and
   a programmable valve actuator coupled to the fluid control valve and to the programmable controller, for actuating the valve in accordance with programmable control logic contained therein, and for actuating the valve in response to external control signals applied to the control logic by the programmable controller.

4. The safety monitoring and control system of claim 3 which further comprises:
   an alarm system coupled to the programmable controller that is activated thereby in the event of an emergency condition detected by the programmable controller.

5. The safety monitoring and control system of claim 1 which further comprises:
   a fluid control valve for controlling the flow of a fluid therethrough; and
   a programmable valve actuator coupled to the fluid control valve and to the programmable controller, for actuating the valve in accordance with programmable control logic contained therein, and for actuating the valve in response to control signals applied to the control logic by the programmable controller.

6. The safety monitoring and control system of claim 5 which further comprises:
   an alarm system coupled to the programmable controller that is activated thereby in the event of an emergency condition detected by the programmable controller.

7. A fluid flow safety monitoring and control system for controlling distribution of a fluid, said system comprising:
   a reservoir for containing a fluid;
   a level sensor coupled to the reservoir for indicating fluid level therein;
   a fluid flow sensor for sensing a fluid flow at an output of the system and for providing an output signal indicative thereof;
   a valve coupled between the reservoir and the fluid flow sensor;
   a programmable valve actuator coupled to the valve for actuating the valve in accordance with programmable control logic contained therein, and for actuating the valve in response to external control signals applied to the control logic; and
   a programmable controller coupled to the level sensor, fluid flow sensor, and programmable valve actuator, and which comprises a seismic sensor for detecting a seismic disturbance and providing output signals indicative of the seismic disturbance, for responding to output signals generated by the level sensor, fluid flow sensor, programmable valve actuator, and seismic sensor, and for generating first control signals that are applied to the programmable valve actuator in the absence of a seismic disturbance and second control signals that are applied to the programmable valve actuator in the presence of a seismic disturbance so as to control the distribution of fluid from the fluid flow system.

8. The fluid flow safety monitoring and control system of claim 7 which further comprises:
   a host computer coupled to the programmable controller for programming the programmable controller in response to operator inputs and for generating reports derived from data provided by the programmable controller in response to output signals generated by the level sensor, fluid flow sensor, programmable valve actuator, and seismic sensor.

9. A fluid flow safety monitoring and control system for controlling distribution of a fluid, said system comprising:
   a pneumatically controlled fluid control valve;
   a host computer coupled to the valve for controlling the distribution of fluid therethrough;
   an air supply system for providing air that activates the pneumatically controlled fluid control valve in response to control signals provided by the host computer;
   a seismic control solenoid disposed between the air supply system and the pneumatically controlled fluid control valve; and
   a programmable controller coupled to the host computer, the air supply system, and seismic control solenoid, and which comprises a seismic sensor for detecting a seismic disturbance and providing output signals indicative of the seismic disturbance, for generating first control signals that are applied to the seismic control solenoid and the host computer in the absence of a seismic disturbance and second control signals that are applied to the seismic control solenoid and the host computer in the presence of a seismic disturbance so as to control the distribution of fluid from the air supply system.

10. The fluid flow safety monitoring and control system of claim 9 which further comprises:
    an exhaust solenoid coupled between the seismic control solenoid and the pneumatically controlled fluid control valve that is controllable by the host computer so as to open and close it.

11. The fluid flow safety monitoring and control system of claim 10 which further comprises:
    a reserve air supply system; and
    a reserve air supply solenoid coupled between the air supply system and the seismic control solenoid and coupled to the programmable controller for coupling the reserve air supply system into the fluid flow safety monitoring and control system in the event of failure of the air supply system.

12. A safety monitoring and control system that comprises:
    a sensor for sensing a predetermined condition and for providing output signals indicative of the predetermined condition;
    a switch;
    a programmable controller coupled to the sensor and to the switch and which comprises a seismic sensor for detecting a seismic disturbance and providing output signals indicative of the seismic disturbance, for responding to the output signals from the sensor and the output signals from the seismic sensor, and for providing first control signals that are applied to the switch in the absence of a seismic disturbance and second control signals that are applied to the switch in the presence of a seismic disturbance so as to control the operation of the system; and a host computer coupled to the programmable controller that is adapted to program the programmable controller in response to operator inputs.

13. The safety monitoring and control system of claim 12 which further comprises:

a fluid control valve for controlling the flow of a fluid therethrough; and a programmable valve actuator coupled to the fluid control valve and to the programmable controller, for actuating the valve in accordance with programmable control logic contained therein, and for actuating the valve in response to control signals applied to the control logic by the programmable controller.

14. The safety monitoring and control system of claim 13 which further comprises:

an alarm system coupled to the programmable controller that is activated thereby in the event of an emergency condition detected by the programmable controller.

* * * * *